US008601101B1

(12) United States Patent
Singh

(10) Patent No.: US 8,601,101 B1
(45) Date of Patent: Dec. 3, 2013

(54) CLUSTER COMMUNICATIONS FRAMEWORK USING PEER-TO-PEER CONNECTIONS

(75) Inventor: Servesh Pratap Singh, Kanpur (IN)

(73) Assignee: Oracle America, Inc., Redwood City, CA (US)

(*) Notice: Subject to any disclaimer, the term of this patent is extended or adjusted under 35 U.S.C. 154(b) by 3040 days.

(21) Appl. No.: 10/878,785

(22) Filed: Jun. 28, 2004

(51) Int. Cl.
*G06F 15/173* (2006.01)

(52) U.S. Cl.
USPC ........... 709/223; 709/217; 709/224; 709/249; 370/254; 702/186

(58) Field of Classification Search
USPC .................. 709/217, 249, 223–224; 702/186; 370/254
See application file for complete search history.

(56) References Cited

U.S. PATENT DOCUMENTS

| | | | |
|---|---|---|---|
| 4,633,245 A | 12/1986 | Blount et al. | |
| 6,006,259 A | 12/1999 | Adelman et al. | |
| 6,173,374 B1 | 1/2001 | Heil et al. | |
| 6,185,601 B1 | 2/2001 | Wolff | |
| 6,314,465 B1 | 11/2001 | Paul et al. | |
| 6,351,775 B1 | 2/2002 | Yu | |
| 6,463,454 B1 | 10/2002 | Lumelsky et al. | |
| 6,697,849 B1 | 2/2004 | Carlson | |
| 6,728,748 B1 | 4/2004 | Mangipudi et al. | |
| 6,779,017 B1 | 8/2004 | Lamberton et al. | |
| 6,850,982 B1 | 2/2005 | Siegel | |
| 6,874,031 B2 | 3/2005 | Corbeil | |
| 6,880,089 B1 | 4/2005 | Bommareddy et al. | |
| 6,886,035 B2 | 4/2005 | Wolff | |
| 7,003,574 B1 | 2/2006 | Bahl | |
| 7,020,695 B1* | 3/2006 | Kundu et al. | 709/223 |
| 7,039,694 B2* | 5/2006 | Kampe et al. | 709/222 |
| 7,120,681 B2* | 10/2006 | Frelechoux et al. | 709/221 |
| 7,185,076 B1* | 2/2007 | Novaes et al. | 709/223 |
| 2002/0042693 A1* | 4/2002 | Kampe et al. | 702/186 |
| 2002/0103893 A1* | 8/2002 | Frelechoux et al. | 709/223 |
| 2003/0014526 A1 | 1/2003 | Pullara et al. | |
| 2003/0056013 A1* | 3/2003 | Laschkewitsch et al. | 709/249 |
| 2003/0187927 A1* | 10/2003 | Winchell | 709/204 |

(Continued)

OTHER PUBLICATIONS

Mitzenmacher et al., "Load Balancing with Memory," the 43$^{rd}$ Annual IEEE Symposium on Foundations of Computer Science, Nov. 16-19, 2002, (1 page).

(Continued)

*Primary Examiner* — Thu Ha Nguyen
(74) *Attorney, Agent, or Firm* — Robert C. Kowert; Meyertons, Hood, Kivlin, Kowert & Goetzel, P.C.

(57) ABSTRACT

Various embodiments of a system and method for each node in a cluster including a peer-to-peer communication channel compiling and maintaining its own cluster membership are disclosed. In one embodiment, each cluster node may be coupled to every other node and commonly-accessible storage through a network. When a node starts up and attempts to join the cluster, it may access cluster information data stored in the commonly-accessible storage. This information may include a list of all nodes that are potential cluster members. Based on the cluster membership information, the joining node may request a peer-to-peer connection with each potential cluster member. When such a request results in establishment of a connection, the joining node may add the name of the target node to its cluster membership list. Likewise, when a member node grants a connection to a node, it may add the joining node to its cluster membership list.

17 Claims, 19 Drawing Sheets

(56) References Cited

U.S. PATENT DOCUMENTS

2004/0243709 A1    12/2004   Kalyanavarathan et al.
2004/0267901 A1*   12/2004   Gomez ........................ 709/217
2006/0080446 A1     4/2006   Bahl
2007/0168508 A1*    7/2007   Wang et al. ................... 709/225
2007/0226359 A1*    9/2007   Gunduc et al. ................ 709/229

OTHER PUBLICATIONS

Gibbens et al., "Dynamic Routing in Multiparented Networks," IEEE/ACM Transactions on Networking, vol. 1. No. 2, Apr. 1993, (pp. 261-270).

* cited by examiner

CLUSTER COMMUNICATIONS FRAMEWORK USING PEER-TO-PEER CONNECTIONS

BACKGROUND

1. Field of the Invention

This invention relates to computer systems, and more particularly to inter-nodal communications in a cluster environment.

2. Description of the Related Art

Distributed applications are often implemented as part of commercial and non-commercial business solutions for an enterprise. For example, a company may leverage the use of an enterprise application that includes various databases distributed across multiple computers. Applications of this type, which support E-commerce, typically support hundreds or thousands of sessions simultaneously during periods of peak utilization. For scalability and fault tolerance, the servers running such applications may be clustered.

FIG. 1 illustrates a networked computer system including a cluster 100, according to prior art. Clients 110 may be coupled to cluster 100 through network 120. Clients 110 may initiate sessions with application components running on nodes 140. Load balancer 130 may distribute session requests from clients 100 to nodes 140 to "balance" the total workload among the servers. In some cases, load balancing may amount to nothing more than round-robin assignment of new sessions to cluster members. In other cases, load balancer 130 may have access to data concerning the current workload of each node 140. When a new session request is received, load balancer 130 may use this data to determine which server has the "lightest" workload and assign the new session to that node. Regardless of the distribution algorithm used by the load balancer 130, the capacity of the application component(s) running on the nodes 140 of the cluster is greater that if it were limited to only a single node, and most architectures for cluster 100 include scalability to allow for increasing capacity by adding additional nodes 140 to the cluster.

Another desirable characteristic of an application component(s) executing on a server cluster is high availability. For an application component running in a non-clustered environment, the failure of its server makes the component unavailable until the server is repaired or replaced. This loss of service may be very undesirable for an enterprise, particularly if the function being performed by the application component is, for example, registering orders for products or services. If the application component is executing on a cluster, one or more nodes 140 within the cluster can fail, and the application may continue to provide service on the remaining active servers, although at a reduced capacity. This attribute of a clustered server environment is called "failover", and it can be implemented in a variety of ways. In some cases, the load balancer 130 may determine that a given node 140 has failed and simply not assign any further work to that node. This insures that new requests will receive service, but does nothing for work that was in-process on the failed server.

Many cluster architectures have been formulated to address the need for graceful failover of cluster members to attempt to minimize the impact of server failure on end users. For a failover to be truly graceful, it should be completely transparent to the client. In most cases, graceful failover within a cluster requires the nodes 140 to be "cluster-aware" to the point of being able to detect the failure of fellow cluster members, and in some cases each server needs to be able to resume the processing of jobs that were executing on the failed server at the time it failed. The increase in complexity for each node 140 to support this level of graceful failover may be quite large in terms of the design, verification, and maintenance of the additional functionality.

The cluster-awareness described above as a basis for such functionality as load balancing and failover, may require an inter-nodal cluster communication channel. For example, to support load balancing and/or failover, each node may require current information on cluster membership including existing nodes that have failed and/or new nodes that have joined the cluster. When a cluster node fails, load-balancing functions such as those described previously may need to be aware of the failure so as not to send new requests to the failed node. Likewise, a failed node should be removed from the list of candidates for failover node for all other nodes.

The architecture of the cluster communication channel may take various forms from daisy chained, to star coupled, to rings, and bussed. Additionally, various communication protocols may be implemented for use on multiple network topologies. In some configurations, each node may gather cluster membership information for itself, while in others one central node may determine cluster membership and disseminate a list to other members.

SUMMARY

Various embodiments of a system and method for each node in a cluster including a peer-to-peer communication channel compiling and maintaining its own cluster membership are disclosed. In one embodiment, each cluster node may be coupled to every other node and commonly-accessible storage through a network. When a node starts up and attempts to join the cluster, it may access cluster information data stored in the commonly-accessible storage. This information may include a list of all nodes that are potential cluster members. Based on the cluster membership information, the joining node may request a peer-to-peer connection with each potential cluster member. When such a request results in establishment of a connection, the joining node may add the name of the target node to its cluster membership list. Likewise, when a member node grants a connection to a node, it may add the joining node to its cluster membership list.

Under normal cluster operating conditions, each node may maintain a connection to every other node in the cluster and use each of these connections on either a periodic or aperiodic basis. In one embodiment, each node may have a timer for each connection. Whenever the connect is used the timer may be reset, so that it will only expire if some "relatively" long period elapses in which no communication has taken place with a corresponding node. When a nodes timer expires for a particular connection, the node may attempt to communicate with the node corresponding to the connection. If the communication fails, after a specified number of retries, the initiating node may remove the targeted node from its cluster membership list. In another embodiment, timers may not be used, and the discovery of a failed node may be determined solely by the need for communication with that node. The methods for detecting joining a failed nodes just discussed may allow each node of a cluster to maintain an accurate cluster membership list without the need to pass such a list from one node to another.

In addition to providing for independent detection of changes to cluster membership, the peer-to-peer cluster communication channel may facilitate other cluster management operations. For example, updating an existing application or adding a new application to a cluster may involve cloning or exact replication of resources to all nodes. In a cluster with a non peer-to-peer communication channel, changes to node configuration may have to be performed on a node-by-node basis. An administrator may access one node, change its configuration and then repeat this procedure for the other nodes in the cluster. This process may present significant opportunity for the administrator to fail to get the exact same configuration on each node. If the cluster is put into a state where resources have been added or updated on some nodes but not on others, system function and/or data integrity may be compromised.

In one embodiment, a system administrator may send a request to update the configuration of a cluster to a cluster configuration service in one of the cluster nodes. In response to this request, the cluster configuration service may perform the requested configuration modification on its node and send a node modification request to all the other nodes of the cluster. The other nodes may receive the node modification request from the initiating node and modify their own configurations. Each node may also send a response to the initiating node to inform it as to whether the modification of that node's configuration was successful. If any node reports that it was unsuccessful in making the configuration change, the initiating node may rollback the modification on all nodes.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
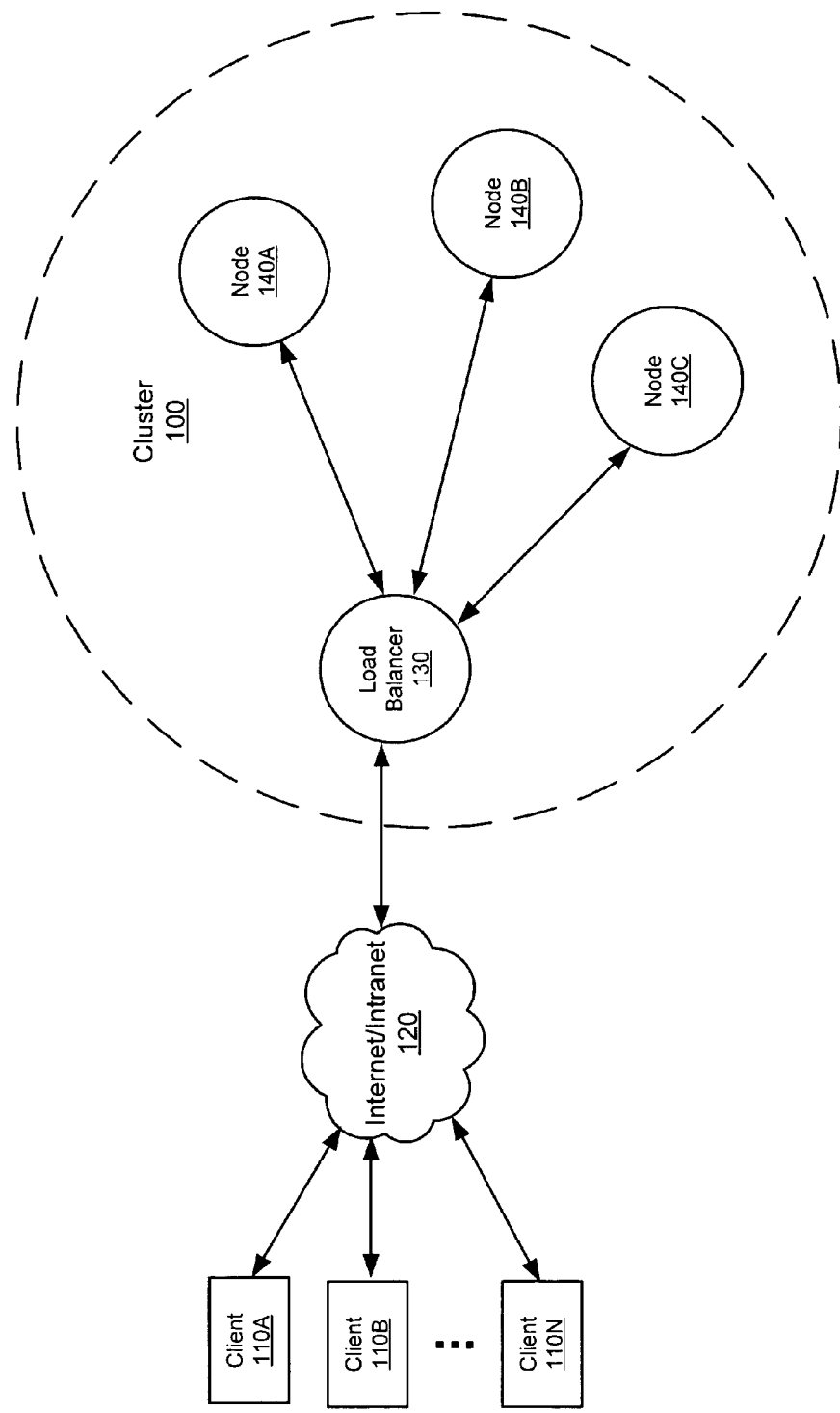
FIG. 1 illustrates a networked computer system including a cluster, according to prior art.
Figure 2:
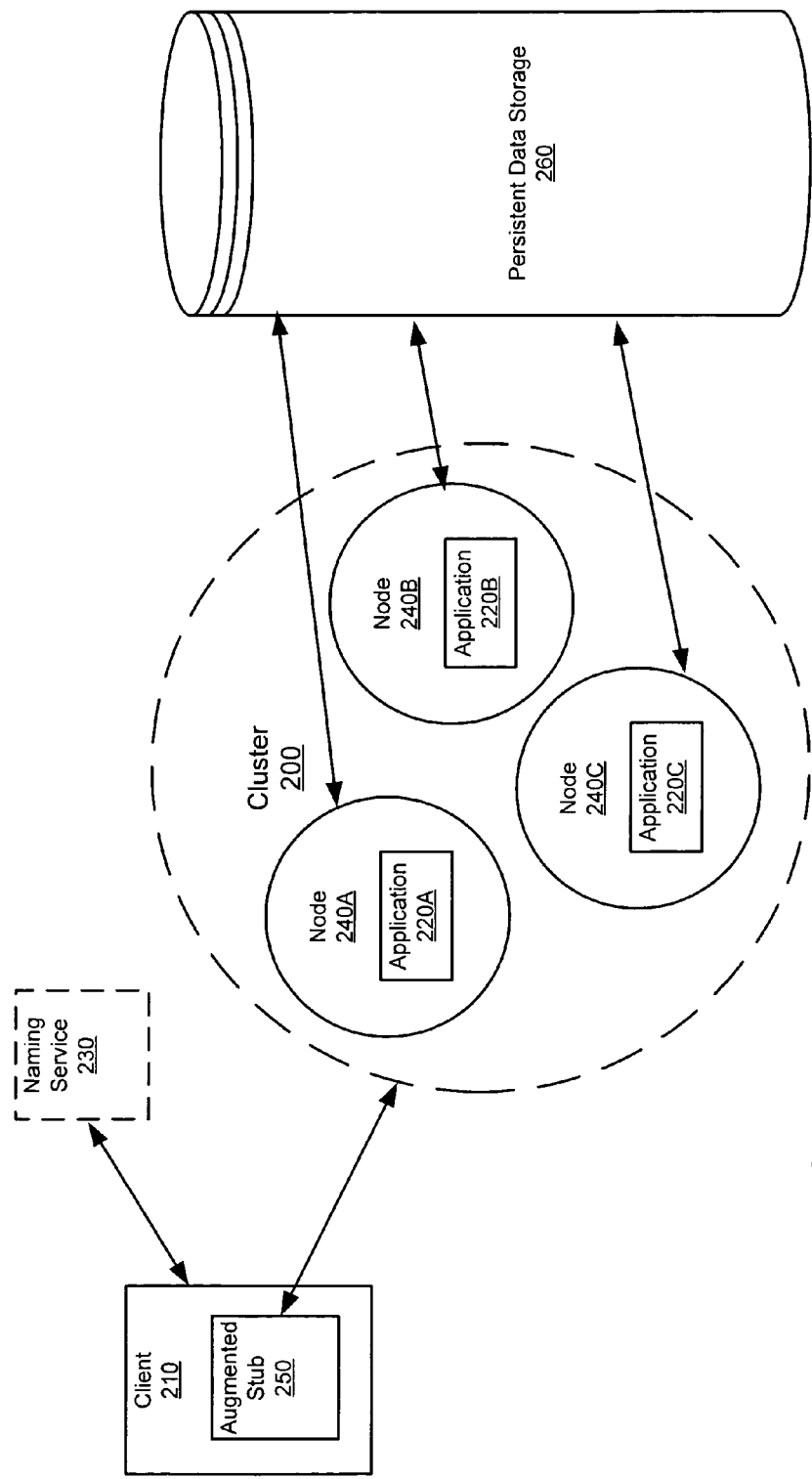
FIG. 2 illustrates the components of a computer system including an augmented stub, according to one embodiment.

FIG. 2 illustrates the components of a computer system, which may be suitable for implementing various embodiments of the disclosed invention. Cluster 200 may include two or more processing nodes 240. Each cluster node 240 may execute one or more application components 220. Application component 220 may provide a service or other functionality accessed by client 210. In one embodiment, application component 220 may be an instantiation of an EJB. An augmented stub 250 may implement an interface of the business object so that it looks like the business object 220 to the client 210. But the augmented stub 250 does not include the business logic of the business object 220. Instead it may include a stub with a connection to the business object 220. The augmented stub 250 is referred to as an "augmented" stub in comparison to a normal stub because it includes fail-over functionality, as described below, that operates transparently to the client. Augmented stub 250 appears to the client as a normal stub for the application component.

The augmented stub 250 for an application component 220 may act as a client's local representative or proxy for the application component 220. The client may invoke a method on the augmented stub, which is responsible for carrying out the method call on the application component 220. In one embodiment, the mechanism for performing a method call on application component 220 may be remote method invocation (RMI). In RMI, a stub within the augmented stub for the application component may implement the same set of remote interfaces that the application component implements. The augmented stub appears as a normal stub to the client. When the augmented stub's method is invoked, the normal stub within the augmented stub may initiate communication over a connection with the cluster node containing the application component, marshal (write and transmit) the parameters to the application component, wait for the result of the method invocation, un-marshal (read) the return value or exception returned, and return the value to the client. The stub may hide the serialization of parameters and the network-level communication in order to present a simple invocation mechanism to the client.

For a client 210 to invoke a method on an application component 220, that client may first need to obtain a reference to the object. A reference to an application component may be obtained from a naming service 230.

When client 210 requests the lookup of an application component 220, naming service 230 may return the augmented stub 250 for the requested application component to the client. In some embodiments, naming service 230 may be cluster-aware, and if the requested object is executing on a cluster, it may return the augmented stub to the client, whereas if the requested object is executing on a single server, it may simply return a normal stub for the requested object. In one embodiment, in response to an initial lookup request for an application component, naming service 230 may return an augmented home stub that includes a normal home stub for the application component. Once the client 210 has obtained the augmented home stub (which appears to the client as the normal home interface to the desired application component 220), it may invoke the create( ) or find( ) methods provided by the home interface to obtain the application component's remote interface (which may be returned as an augmented remote stub).

In one embodiment, if the distributed application component 220 is stateful, that is if it includes data that must be maintained between client requests or longer, then the component may store the that persistent data to commonly accessible persistent data storage 260. In one embodiment persistent data storage 260 may be a database running on a backend system coupled to the cluster by a network. In order to support the persistence requirements of application components 220 and failure recovery methods of cluster 200, persistent data storage 260 may be accessible by all cluster members 240.

Figure 2A:
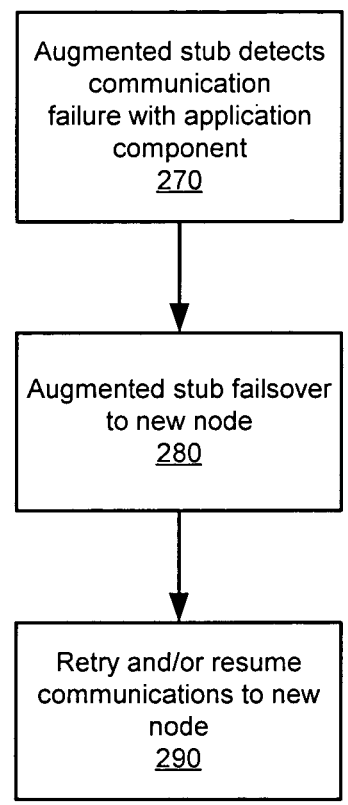
FIG. 2A is a flowchart of one embodiment of a method for fail-over in a cluster using an augmented stub.

FIG. 2A is a flowchart of one embodiment of a method for fail-over using an augmented stub. At block 270, the augmented stub may detect a communication failure associated with its included stub. For example, the node providing the application component corresponding to the augmented stub may have failed. In response to the node failure, as shown in block 280, the augmented stub may failover to a new node. In one embodiment this may involve obtaining the augmented stub a new to an instance of the application component on the new node. Using the new stub, the augmented stub may then retry and/or resume communications to the new node. This fail-over may occur transparently to the client.

Figure 3:
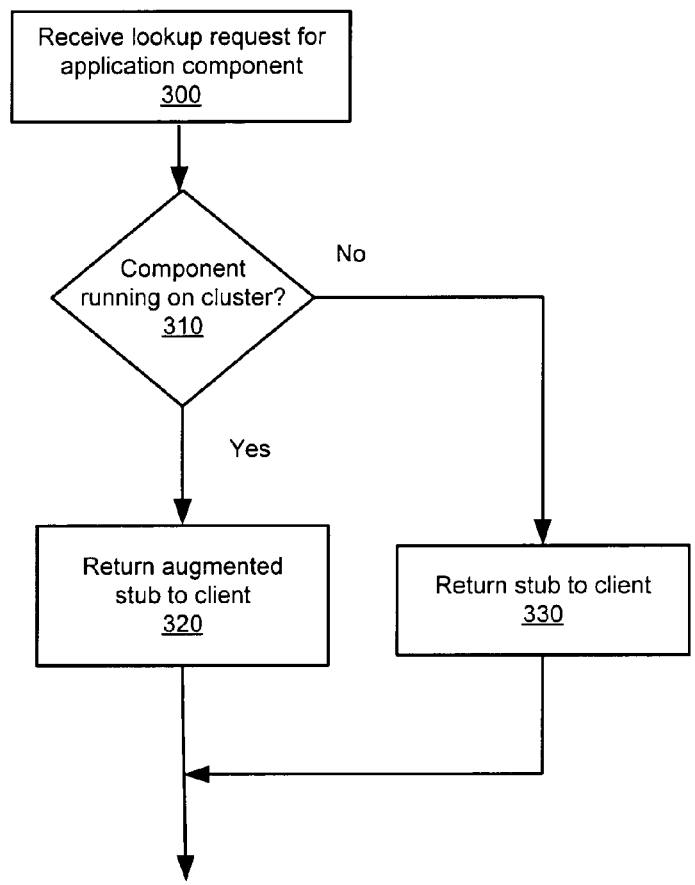
FIG. 3 is a flow chart of a method for operating a naming service, according to one embodiment.

FIG. 3 is a flow chart of a method for a naming service to facilitate fail-over, according to one embodiment. At block 300, the naming service may receive a lookup request for an application component from a client. The naming service may include information on the nodes running the application component to determine whether the requested component is executing on a cluster, as indicated in decision block 310. If the requested application component is only running on a single server (non-cluster configuration), then the naming service may return a normal stub to the requesting client, as shown in block 330. However, if multiple instances of the application are determined to be running as a cluster, at decision block 310, then the naming service may return an augmented stub to the client, as indicated in block 320. The augmented stub may include a normal stub to the client and may also transparently provide fail-over functionality, as further described herein.

Figure 4:
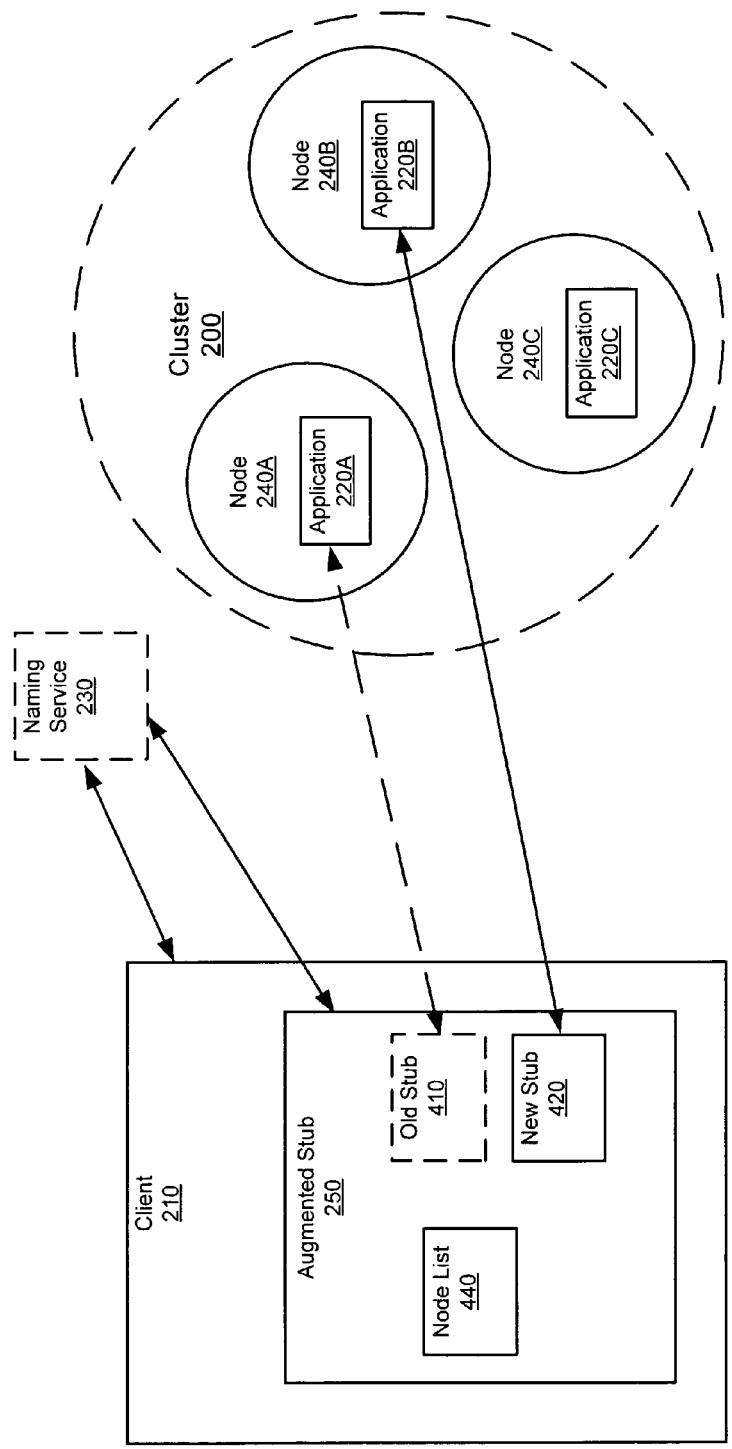
FIG. 4 illustrates the components of an augmented stub, according to one embodiment.

FIG. 4 illustrates the components of an augmented stub, according to one embodiment. Client 210, may include augmented stub 430. Augmented stub 430 may have been returned by a cluster-aware naming service in response to a look-up request from the client, as described above. Augmented stub 430 may include node list 440, along with a stub (e.g. stub 410) to an application component. To the client 210, augmented stub 250 may appear as a normal stub for the application component. When client 210 wants to invoke a function of an application component 220 running on the nodes of cluster 200, it may send a lookup request for the required component to naming service 230. Naming service 230 may provide client 210 with augmented stub 430 including node list 440 and stub 410. Node list 440 may include the names of each node 240 in cluster 200 that is running the application component. Stub 410 may provide a connection with one of the nodes from node list 440, for example node 240A. Client 210 may use stub 410 (transparently via augmented stub 250) to access the application component instance running on node 240A.

At some point, cluster node 240A may experience a failure. This failure could be a hardware failure of the platform of the node, a software failure in the application component itself or the supporting software running on the platform, or a failure in the network linking the node to the rest of the cluster. Augmented stub 430 may detect this loss of communication with node 240A and select another node from node list 440 that is running the application component. For example, if node list 440 includes nodes 240A, B, and C, and augmented stub 430 detects the failure of node 240A, it may select node 240B to fail-over the application component. Augmented stub 430 may send a lookup request to naming service 230, which may return new stub 420 for application instance 220B, so that new stub 420 may be obtained to replace old stub 410. Augmented stub 430 may use new stub 420 to send the client request that failed on node 240A, and all subsequent requests to node 240B. Augmented stub 430 may perform the functions described above completely transparently to the client 210, thus allowing for graceful failover of remote services provided for the client from node 240A to node 240B.

Figure 5:
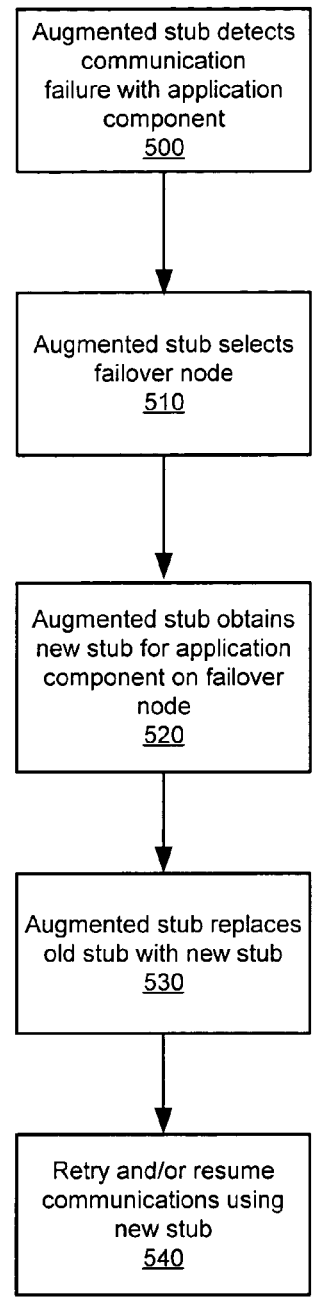
FIG. 5 is a flowchart of a method for fail-over in a cluster using an augmented stub, according to one embodiment.

FIG. 5 is a flowchart of a method for fail-over in a cluster using an augmented stub, according to one embodiment. At block 500, an augmented stub may detect a communication failure associated with its included stub. For example, the node connected to the current stub included in the augmented stub may have failed. As indicated at block 510, the augmented node may select a failover node from a list of cluster nodes running the required application component, which it maintains. The augmented node may obtain a new stub connecting to the instance of the required application component executing on the failover node, as shown in block 520. In one embodiment, the augmented stub may obtain a new stub connecting to the failover node by sending a lookup request to a naming service. At block 520, the augmented node may replace the old stub connected to the failed node with the new stub connected to the active node. With the new node in place, the augmented node may retry and/or resume communications with the application component on the failover node, as indicated in block 540, transparently to the client.

Figure 6:
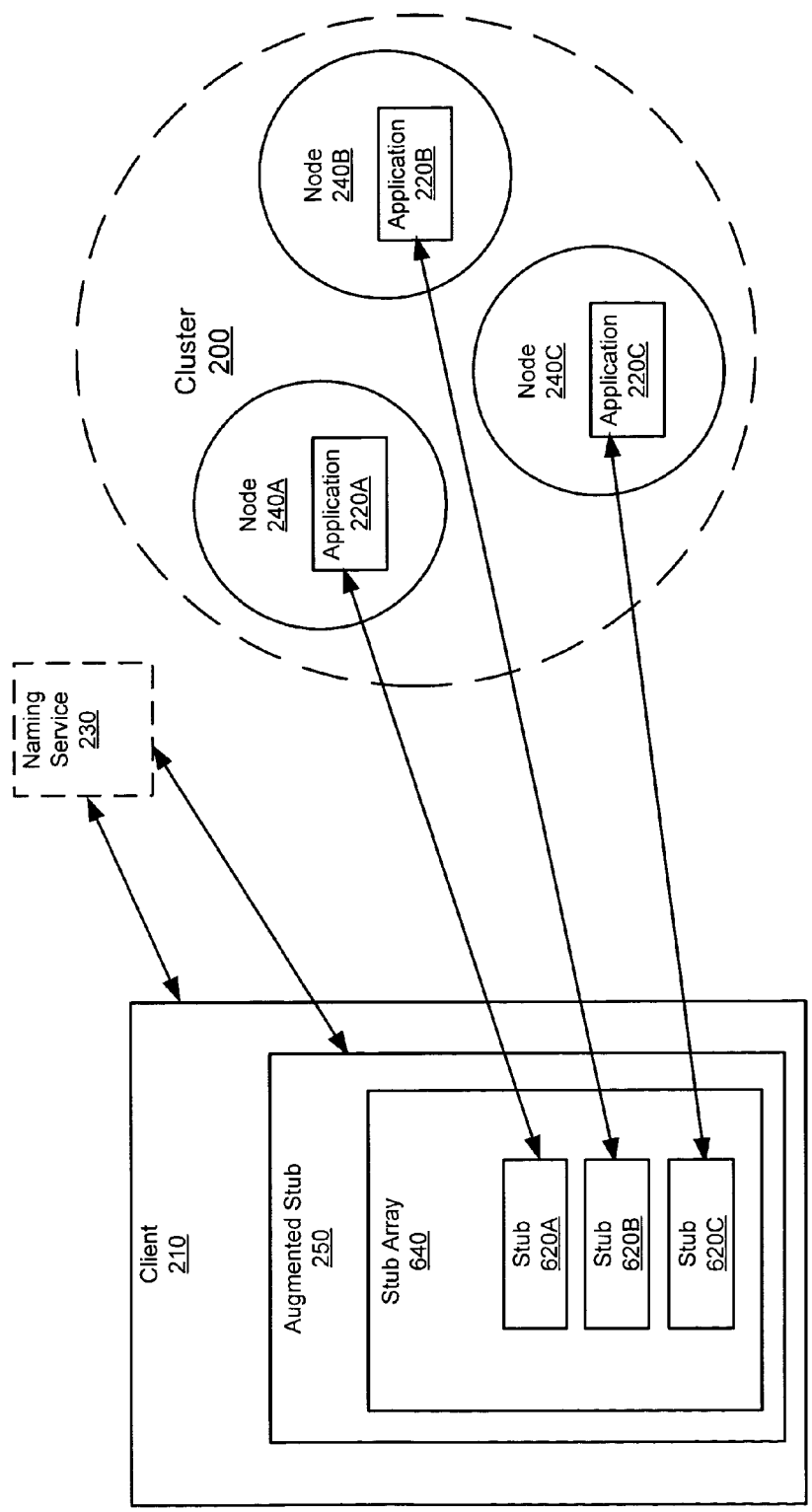
FIG. 6 illustrates the components of an augmented stub, according to another embodiment.

FIG. 6 illustrates the components of an augmented stub, according to another embodiment. Augmented stub 250 may include stub group or array 640, which includes stubs 620. Each stub 620 may be configured to provide an interface to different instances of the same application component on different nodes of cluster 200 to which the augmented stub can failover in the event of a node failure. For example, augmented stub 250 may initially select one stub (e.g. stub 620A) from stub array 640 to use in communicating with an instance of the distributed application component running on a node of the cluster (e.g. node 240A). All client 210 requests for communications with the application component may be sent to node 240A using this stub. Since all other stubs in the stub array 640 are linked to cluster nodes which host the required application component, they are candidates to become the failover node should node 240A experience a failure.

The augmented stub 250 may detect loss of communication with the application component 220A or failure of node 240A. In response to such a failure, augmented stub 250 may select another stub from stub array 640, for example stub 620B. The node associated with the selected stub 620B, in this case node 240B, then becomes the failover node for recovering the required functionality of the application component. The augmented stub 250 may retry and/or resume communications with the application component using stub 620B. This fail-over functionality of the augmented stub may occur transparently to client 210. For example, client 210 may be unaware of the fail-over to a different node in the cluster.

Figure 7:
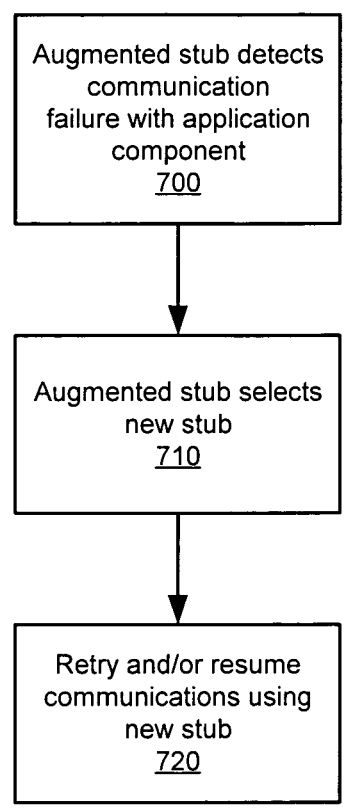
FIG. 7 is a flowchart for a method of operating an augmented stub, according to one embodiment.

FIG. 7 is a flowchart for a method of cluster fail-over using an augmented stub, according to one embodiment. A client may use an augmented stub to interface to a clustered application component. As described above, the augmented stub may include a group or array of stubs for interfacing to different instances of the application component on different nodes of the cluster. At some point in time, the augmented stub may detect a communication failure with the application component associated with the stub currently in use, as indicated in block 700. In one embodiment, the augmented stub may remove the stub currently in use from the stub array in response to a failure of the corresponding node.

As shown in block 710, the augmented node may select a new stub from the stub array. The node corresponding to the selected stub may become the failover node to provide the application component functionality. The new stub may be selected randomly or by using a load balancing mechanism, or by any other selection technique. In one embodiment, the augmented stub may select the new stub based on a round robin method. In another embodiment, the augmented stub may include data on cluster workload distribution, and may select a stub corresponding to the node whose workload is currently lightest. Regardless of the selection method, once the new stub has been placed into service, the augmented node may retry and/or resume communication with the application component instance running on the failover node using the new stub, as shown in block 720. This fail-over may occur transparently to the client.

In order to successfully failover the application component from a failed node to a failover node, the augmented stub 250 may need to maintain data concerning the state of the cluster membership. In one embodiment augmented stub 250 may maintain node list 440. As described previously, node list 440 may include identification of all cluster nodes capable of providing the application component. Therefore, node list 440 represents a list of nodes that are candidates to assume the role of failover node in the event that the node currently being accessed should fail. Cluster membership may change with time as nodes fail or are removed from the cluster for other reasons. Additionally, failed nodes may recover and rejoin the cluster, or new nodes may be added to the cluster.

In another embodiment, the augmented stub may include a stub array 640 that may include stubs configured to connect to all nodes in cluster 200 that are capable of providing the application component, including the one that is currently being used to provide communications with an instance of the application component. As described in the previous paragraph, cluster membership may evolve with time, and stubs linked to failover candidates at one point may be invalid at another point, whereas when new failover candidate nodes join the cluster, corresponding stubs should be added to the stub array 640. One method of keeping the node list 440 or stub array 640 up to date may be through the use of a cluster membership state identifier (e.g. epoch number) as described below.

Figure 8:
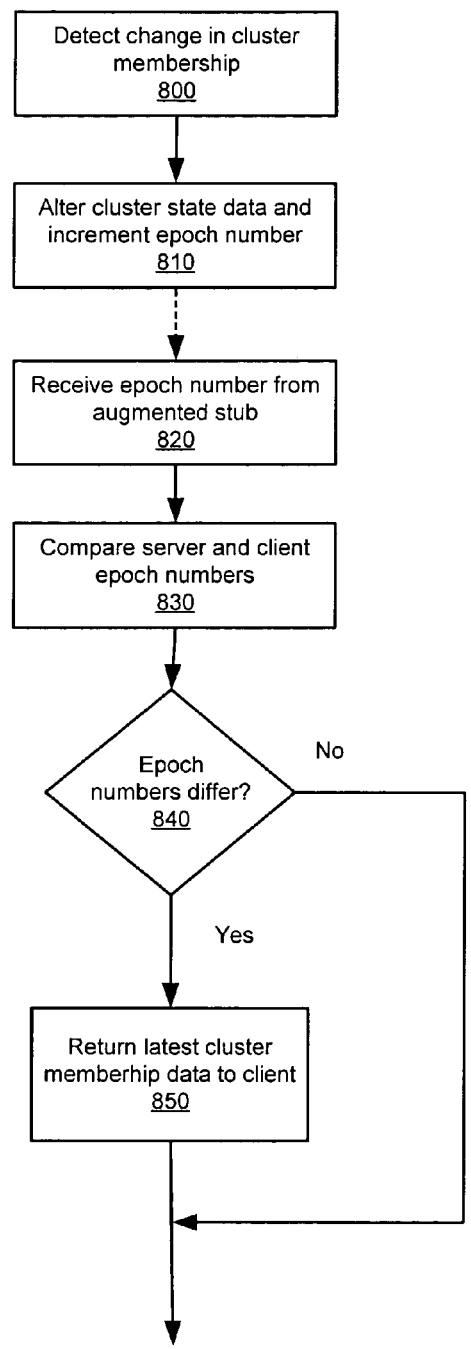
FIG. 8 is a flowchart of a method of operating cluster nodes including cluster epoch numbers, according to one embodiment.

FIG. 8 is a flowchart of a method for updating cluster membership in an augmented stub, according to one embodiment. Each node may maintain cluster state data including cluster membership data. The cluster state data may also include a unique identifier, such as an epoch number that, indicates the cluster configuration during a given period of time. As shown in block 800, each cluster node may be capable of detecting changes to the cluster configuration. In one embodiment, this may include some central agent that detects node additions and deletions and sends update information to all cluster members. In other embodiments, cluster nodes may use a peer-to-peer or other communication mechanism to communicate cluster membership change events. When a membership change is detected, each member may alter its cluster state data to reflect the change, as indicated in block 810. This alteration of cluster state data may include the changing of the unique identifier (e.g. epoch number). In some embodiments, the unique identifier may be an epoch number that is incremented each time there is a change in cluster membership.

As indicated in block 820, at some point in time a cluster node may receive a request from an augmented stub including an identifier (e.g. epoch number) indicating the configuration in which the augmented stub believes that cluster to be. This augmented stub's identifier may correspond to the membership of the node list 440 in one embodiment, or the stub array 640 in another embodiment. As indicate in block 830, the node may compare the received cluster membership identifier with its own identifier. For example, in an embodiment using epoch numbers as unique identifiers of cluster membership state, the node may compare the epoch number received from the augmented stub to its own epoch number. If the two identifiers differ, as determined in decision block 840, the node may return its copy of the cluster state data, or some subset thereof, to the augmented stub, as shown in block 850. In this way, node list 440 and/or stub array 640 may be updated to reflect the current state of cluster membership. In an embodiment in which the augmented stub includes a stub array, the augmented stub may send a lookup request to a naming service to obtain a new stub for any new cluster members in order to update its stub array. In one embodiment, augmented stub 250 may send its cluster membership state identifier to a node each time the client accesses the node. In another embodiment, augmented stub 250 may send its epoch number to a node on a periodic or aperiodic basis, unassociated with client accesses.

Distributed applications components 220 may be either stateless or stateful. Graceful failover of a stateless application component may only require the instantiation of the component on the failover node since the new instance can immediately provide the same functionality as the failed instance.

Failing over a stateful application component in such a way that the client 210 is completely unaware of the failure, may be somewhat more complex. Apart from similar recovery of the application component instance on the failover node, the state of the application component must be restored on the new instance. Since access to a node's memory is lost with the failure of the node, graceful failover of a stateful application component may require that the component persist state data to a persistent store available to other nodes of the cluster, as updates to the state occur.

In one embodiment, an instance of application component 220 may persist its state data to persistent data storage 260 whenever a change occurs. In another embodiment, the container in which application component 220 is executing may be responsible for persisting changes to the application component state for that instance. In both of these cases, the persistent data store 260 may include the latest version of the application component state.

If the node executing a particular instance of application component 220 should fail, all the other nodes of the cluster may have access to its state data in persistent data store 260. Once the augmented stub associated with the failed instance has instantiated a new instance of the application component on another node, the new instance may be able to locate and access the state data of the failed instance using a primary key supplied by the augmented stub.

Some application component containers may provide only limited failover capability. In this case, whenever an instance of a stateful application component is created, a duplicate or mirror copy may be placed on another node in the same cluster. The duplicate may not be used unless the node running the primary fails, in which case the duplicate may assume the role of the primary and nominate another duplicate. Each time a transaction on the primary commits, its state is synchronized with that of the duplicate. If the primary instance should fail, augmented stub 250 may failover to the duplicate instance, which has the latest state data.

In one embodiment, augmented stub 250 may include functionality for load balancing the nodes of cluster 200 either instead of or in addition to the failover functionality described previously. When a client 210 requests a lookup for an application component 220, an augmented stub 250 may be returned, which includes a load balancing mechanism. Thereafter, when the client 210 makes a create( ) or find( ) request to that application component, the augmented stub 250 may use the included load balancing functions to determine to which node the request should be sent.

Figure 9:
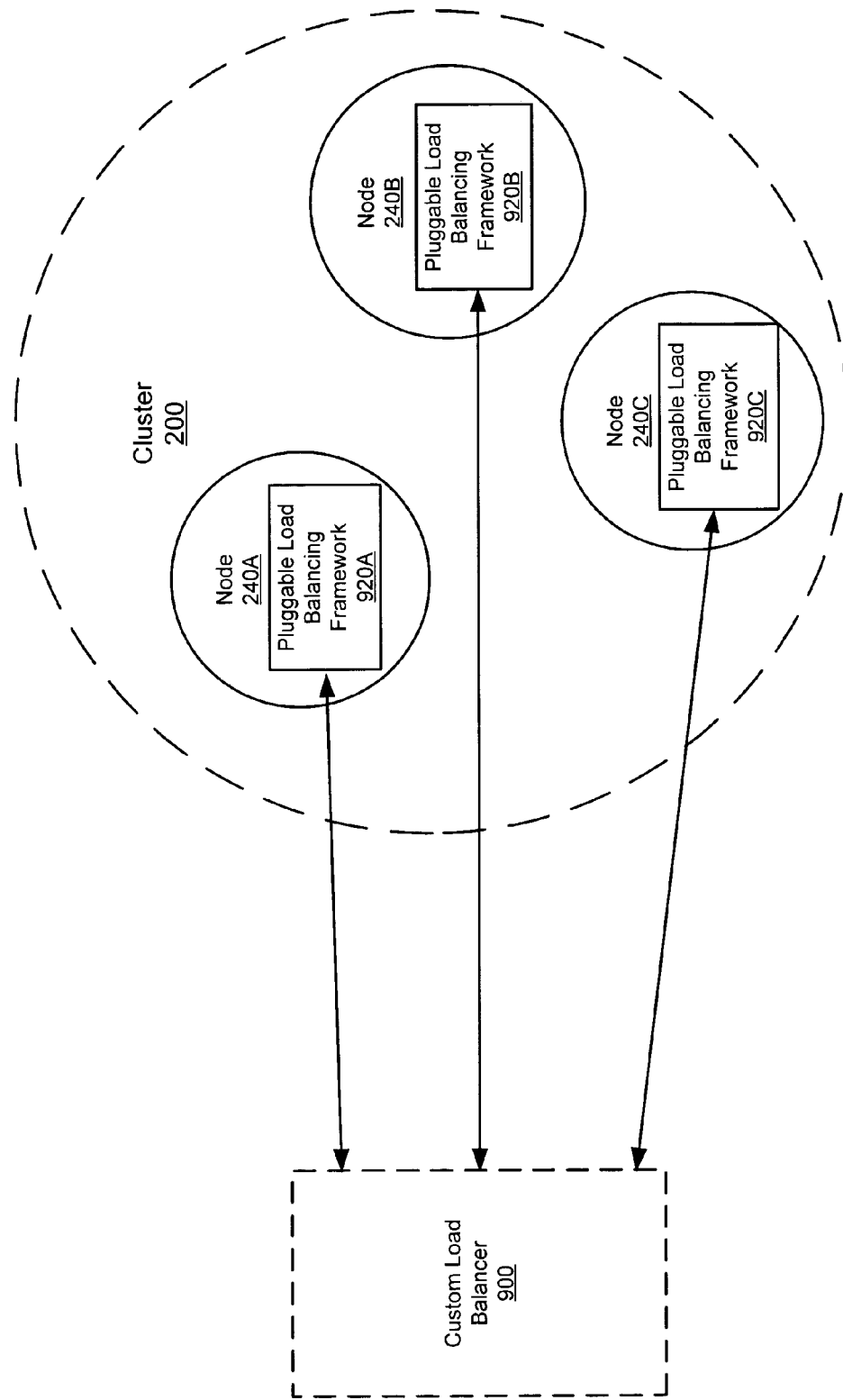
FIG. 9 illustrates cluster wherein each node may include a load-balancing framework, according to one embodiment.

In addition to failover, another feature of a server cluster may be load balancing. Load balancing algorithms may range from simple round robin to schemes requiring data on the state cluster and each node therein. FIG. 9 illustrates cluster 200 wherein each node 240 may include a pluggable load-balancing framework 920, according to one embodiment. Pluggable load-balancing framework 920 may provide an API to support a pluggable custom load balancer 900. In one embodiment, the API may be based on JAVA. The API may allow access to support functions included in pluggable load-balancing framework 920 by any custom load balancer 900 written in compliance with the API. In this way the API may insure the pluggability of a custom load balancer 900 into a variety of components of a clustered computer system, as will be described below.

The pluggable load-balancing framework 920 may allow the administrator of the cluster to select a load balancer to be "plugged in" to the cluster from among different load balancers or to plug in a custom load balancer. Load balancers implementing a variety of load balancing algorithms such as random, round robin, weighted round robin, and load based the load-balancing framework 920, as accessed through the API, may provide a means of communication through which the load balancer may distribute requests to each node 240 of cluster 200. To support custom load balancers including more complex node selection algorithms, load-balancing framework 920 may provide a variety of functions through the API.

In one embodiment, nodes 240 of cluster 200 may include computers of differing capabilities, such as memory capacity or CPU speeds. In this case balancing the load among nodes 240 may include sending more jobs to the nodes with faster CPUs and fewer jobs to those with slower CPUs. In such a system, the load balancer 900 may include a weighted round robin selection algorithm. For example, if the computer of node 240A has a 200 MHz CPU; node 240B, 400 MHz; and node 240C, 800 MHz, the weighted round robin selection algorithm of load balancer 900 may determine that every seventh job be sent to node 240A, while two of every seven jobs go to node 240B, and four jobs go to node 240C. During initialization, custom load balancer 900 may send a query message conforming to the specification of the load-balancing framework API, to each node 240 requesting its capabilities, such as memory capacity or the speed of its CPU. The API-compliant load-balancing framework 920 in each node 240 may implement a function that will return the requested capability information in response to such a query. Custom load balancer 900 may use the information returned from each node 240 to establish the weighting values associated with the weighted round robin selection algorithm. Note that in some embodiments, a weight of zero may be assigned to some nodes in order that they may be reserved as backup nodes for failover purposes.

In another embodiment, custom load balancer 900 may implement a dynamic load-balancing algorithm based on node workload. Load balancer 900 may send an API-compliant load query message to all nodes 240 of the cluster 200 from time to time. The load-balancing framework of each node 240 may respond to the load query by executing one or more functions to produce information such as the number of jobs currently running on the node, the number of queued jobs awaiting execution, expected duration of jobs within the node, or many other types of information that may be used to assess the relative loading of the nodes. Custom load balancer 900 may use the loading information returned from each node 240 in its algorithm to determine to which node the job should be forwarded. In some embodiments, the custom load balancer 900 may poll nodes 240 for loading information on a periodic or aperiodic basis and may use the information to ratio its distribution of new jobs among nodes 240. In other embodiments, instead of load balancer 900 explicitly requesting information, each node may pass its loading information to the load balancer on a periodic or aperiodic basis. For example when the node's loading changes by ten percent, it may send an update to this effect to the load balancer.

Figure 10A:
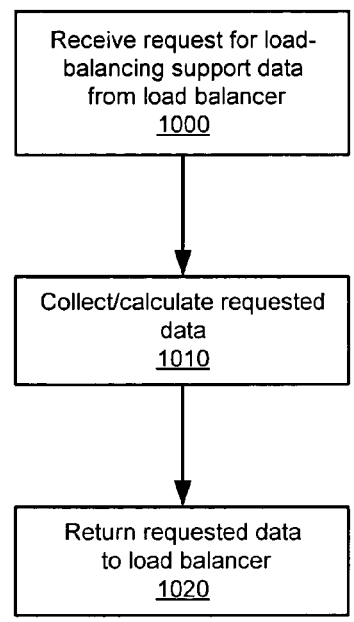
FIG. 10A is a flowchart for a load-balancing framework providing load-balancing support data, according to one embodiment.

FIG. 10A is a flowchart for a load-balancing framework providing load-balancing support data, according to one embodiment. At block 1000, the load-balancing framework may receive a request from the plugged-in load balancer for information particular to the node in which it is resident. As described above this information may include anything from the speed of the node processor to the average number of jobs executing on the node during a specified period. In response to the request, the load-balancing framework may collect the requested information as illustrated in block 1010. In some cases, gathering the required information may only involve reading one or more values stored within the framework. For example, on initialization the load-balancing framework may acquire the speed of the node processor and store this value. Since the value is constant, no further action may be required to respond to requests for this information. On the other hand, a request for the average duration of jobs executed during the previous hour, may require the execution of one or more functions. Once the requested information has been acquired and formatted according to the framework's API, it may be returned to the load balancer, as shown in block 1020. In another embodiment, the load-balancing framework may periodically provide information included in a loading profile to the load balancer without the need for the load balancer to send an explicit request.

Figure 10B:
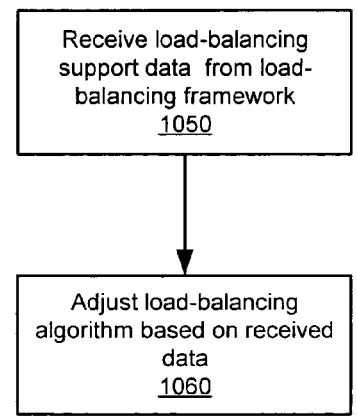
FIG. 10B is a flowchart of a load balancer consuming load-balancing support data, according to one embodiment.

FIG. 10B is a flowchart of a load balancer consuming load-balancing support data, according to one embodiment. At 1050, the load balancer may receive load-balancing support data from the load-balancing framework in a cluster member node. In one embodiment, this may be in response to a request sent by the load balancer. In another embodiment the load-balancing framework may send the data to the load balancer on a periodic basis triggered by the expiration of a timer. In yet another embodiment, the load-balancing framework may monitor one or more values of the load-balancing support data send the data to the load balancer in response to a monitored value exceeding some specified limit. For example, the framework may monitor the number of requests queued in its node and when more than ten requests are queued, may notify the load balancer to this effect. The load balancer may use the received information to adjust its load-balancing algorithm, as shown in block 1060. Continuing the previous example, when the load balancer is informed that a node has ten jobs in its queue, it may either reduce the proportion of requests that it forwards to that particular node or stop forwarding requests to that node altogether until the node's request queue depth has been reduced sufficiently.

Figure 11:
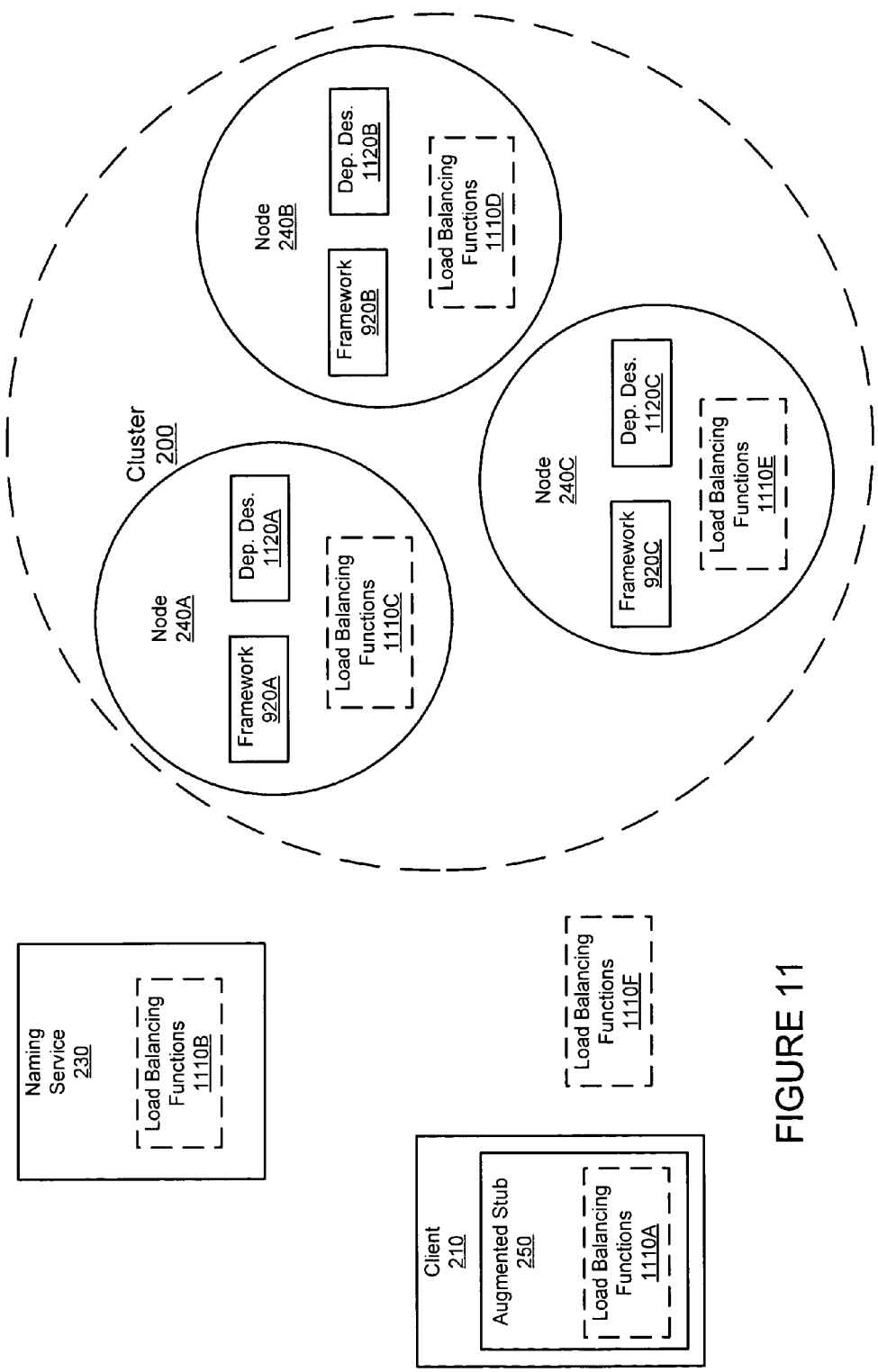
FIG. 11 illustrates various elements of the system that may include load-balancing functions, according to one embodiment.

As was stated previously, the provision of an API within the load-balancing framework 920 may allow a conforming custom load balancer 900 to be plugged into various components of a system including a node cluster. FIG. 11 illustrates various elements of the system that may include load-balancing functions, according to one embodiment. Information pertaining to load balancer 1110 location and configuration may be specified in deployment descriptors 1120 for each node. One location for load-balancing functions 1110 is a separate, dedicated load balancer. The load balancer 1110F may receive or intercept all requests to an application component running on cluster 200. For each request, the dedicated load balancer may execute its algorithm to determine to which of the cluster nodes the request should be routed.

In one embodiment, load-balancing functions 1110 may be incorporated into naming service 230. Naming service 230 may provide the initial access point to the cluster for all clients 210. When a client 210 creates an initial context, a naming factory may return a cluster naming context rather than a standalone naming context. The cluster naming context may include a load balancer containing load-balancing functions 1110. The load balancer may maintain current cluster membership and/or node loading data, which it may obtain from the load-balancing framework of each node 240. When the client 210 performs a lookup on the cluster context, the load balancer may execute its algorithm and return a stub for the "next" node. The term next node may be used to indicate the node selected by the load-balancing algorithm.

As described above load-balancing functions 1110 may be included in an augmented stub. When an augmented stub receives a request to access the corresponding remote application component, the included load-balancing functions 1110 may determine the next node to which the received request will be forwarded. The inclusion of load-balancing functions 1110 in augmented stubs may therefore, result in method calls from a single client being distributed across many of the nodes 240 of cluster 200. Note that this may have significant implications on data integrity/coherency in the case of stateful application components. For example, if a client generates many requests as part of a session and these requests are distributed by load-balancing functions 1110 to several nodes of the cluster 200, then each cluster node must have access to the latest version of the state data for that particular session. In other embodiments, the augmented stub may employ "sticky" load balancing such that requests for the same session are sent to the same node.

Load balancing may be performed by two distinct types of augmented stubs. In the first case, the augmented stub includes a single stub connected to the application component on one particular cluster node. When this augmented stub receives a request to access the application component, it may determine a next node to which the request is to be forwarded and replace its current stub with a stub connected to the next node, obtained from the naming service. The other type of augmented node may include stubs connected to each of the cluster nodes running the application component. When the client requests access to the application component, this augmented stub may also determine a next node to which the request will be forwarded. However, since this augmented stub already includes a stub connected to the next node, no access to the naming service is required.

An example of hierarchical load balancing may be manifest in embodiments in which load-balancing functions 1110 are included in nodes 240. In such a system, an initial load balancer may distribute requests to the nodes 240 of cluster 200 according to an included algorithm. Each node 240 may include additional load-balancing functions 1110. For example, if the node is running an application server including an EJB container, the load-balancing functions 1110 may be included as a part of the EJB container.

The load-balancing functions 1110 within each node 240 may monitor the request load on the node and when a certain threshold is reached, may divert received requests to another node of the cluster 200, according to an included algorithm. In one embodiment, this hierarchical load balancing may act as a "safety valve" to prevent imperfections in the primary load-balancing algorithm from inadvertently overloading a particular node 240. In another embodiment, the load-balancing functions 1110 included in nodes 240 may provide the only load balancing in the system. For example, all requests sent to the application component may be received by node 240A. Node 240A may continue to receive and execute requests until some level of workload is reached. At that point node 240A may divert received requests to node 240B until its workload is reduced and it is once again able to process new requests. Likewise, if node 240B becomes overloaded, it may divert excess received requests to node 240C, and so on.

To support normal cluster operations such as load balancing, failover, and cluster reconfiguration a means for internodal communications may be required. For example, to support load balancing and/or failover, each node may require current information on cluster membership including existing nodes that have failed and/or new nodes that have joined the cluster. When a cluster node fails, load-balancing functions such as those described previously may need to be aware of the failure so as not to send new requests to the failed node. Likewise, a failed node should be removed from the list of candidates for failover node for all other nodes. In one embodiment, each node may gather cluster membership information for itself, while in another embodiment one node may determine cluster membership and disseminate a list to other members.

The architecture of the cluster communication channel may take various forms from daisy chained, to star coupled, to rings, and bussed. Additionally, various communication protocols may be implemented for use on multiple network topologies. For purposes of maintaining current cluster membership information in each node, a peer-to-peer cluster communication channel is described below.

Figure 12:
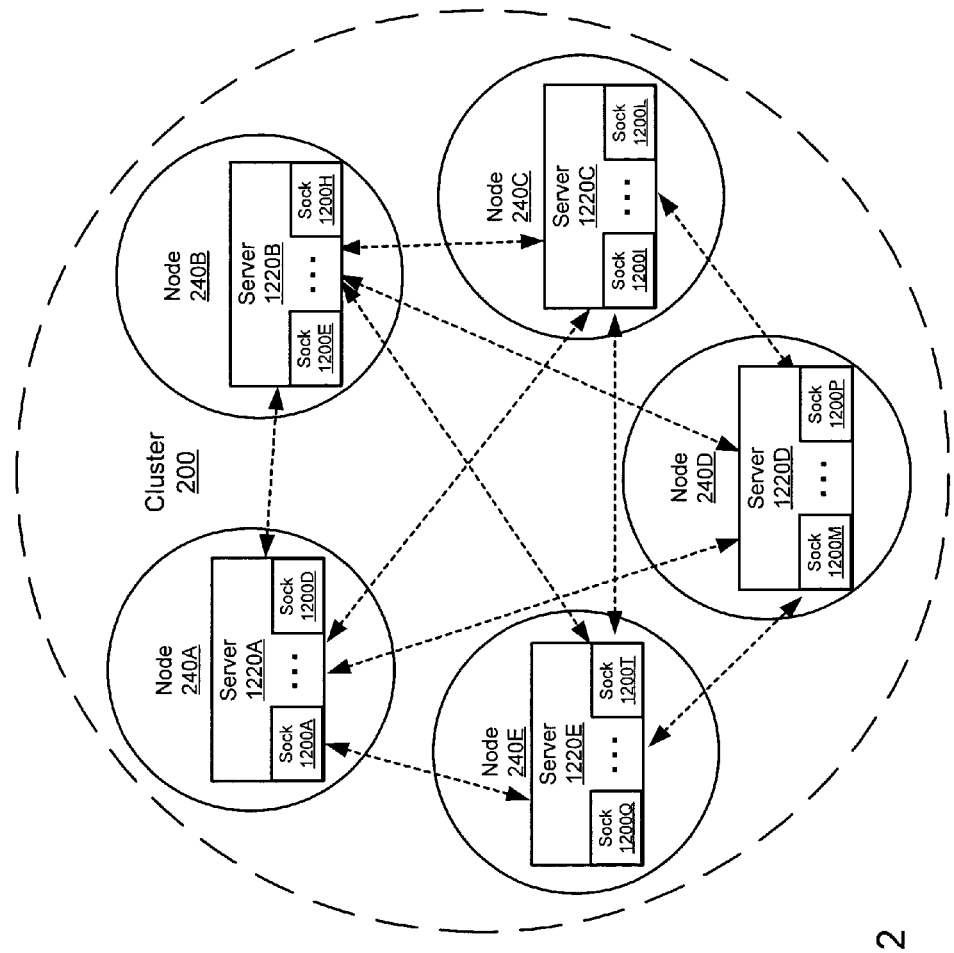
FIG. 12 illustrates a cluster in which each node is networked to every other node as peers, according to one embodiment.

FIG. 12 illustrates a cluster in which each node is communicatively linked to every other node as peers, according to one embodiment. Each node 240 may include a socket 1200 connected to every other active cluster node. In a cluster including N nodes 240, each node may include N−1 sockets 1200. For example, node 240A may include socket 1200A connected to node 240B, socket 1200B connected to node 240C, etc. Node 240A may communicate with node 240B through socket 1200A on a periodic or aperiodic basis. If a communications failure is detected while communicating using socket 1200A, node 240A may interpret this as a failure of node 240B, and remove the node from its list of cluster members.

In order to insure that the failure of a cluster node is detected within a given period of time, each node may occasionally or periodically communicate with every other node of the cluster using the socket connections. In one embodiment, a timer may be set to initiate a communication with a particular node if no other communication takes place with that node prior to the expiration of the timer. In this case, a node failure may go undetected for a maximum time equal to the period of the timer. If the timer is set to a relatively short interval, cluster members may detect the failure of a node at approximately the same time, and their membership data may be updated coherently. Because the cluster communication channel is peer-to-peer, each node may detect the failure based on its socket communication with the failed node and update its cluster membership data without the need for a central entity to manage cluster membership or passing an updated membership list from node to node.

A node joining the cluster may be detected as it makes a socket connection to each existing member. At startup, a node may obtain information on cluster membership and the cluster naming service from commonly accessible storage. With this information, the node may create socket connections to each cluster member based on the peer-to-peer nature of the cluster communication channel. When the joining node establishes a connection to a member node, it may add the name of the member node to its membership list. Likewise, the establishment of the connection may cause the member node to update its cluster membership data to include the joining node without the need to pass a membership list around the cluster. When communication has been attempted with each member node, the joining node may create a server socket and bind it to the naming service so that other nodes can perform lookups and connect to it.

Figure 13:
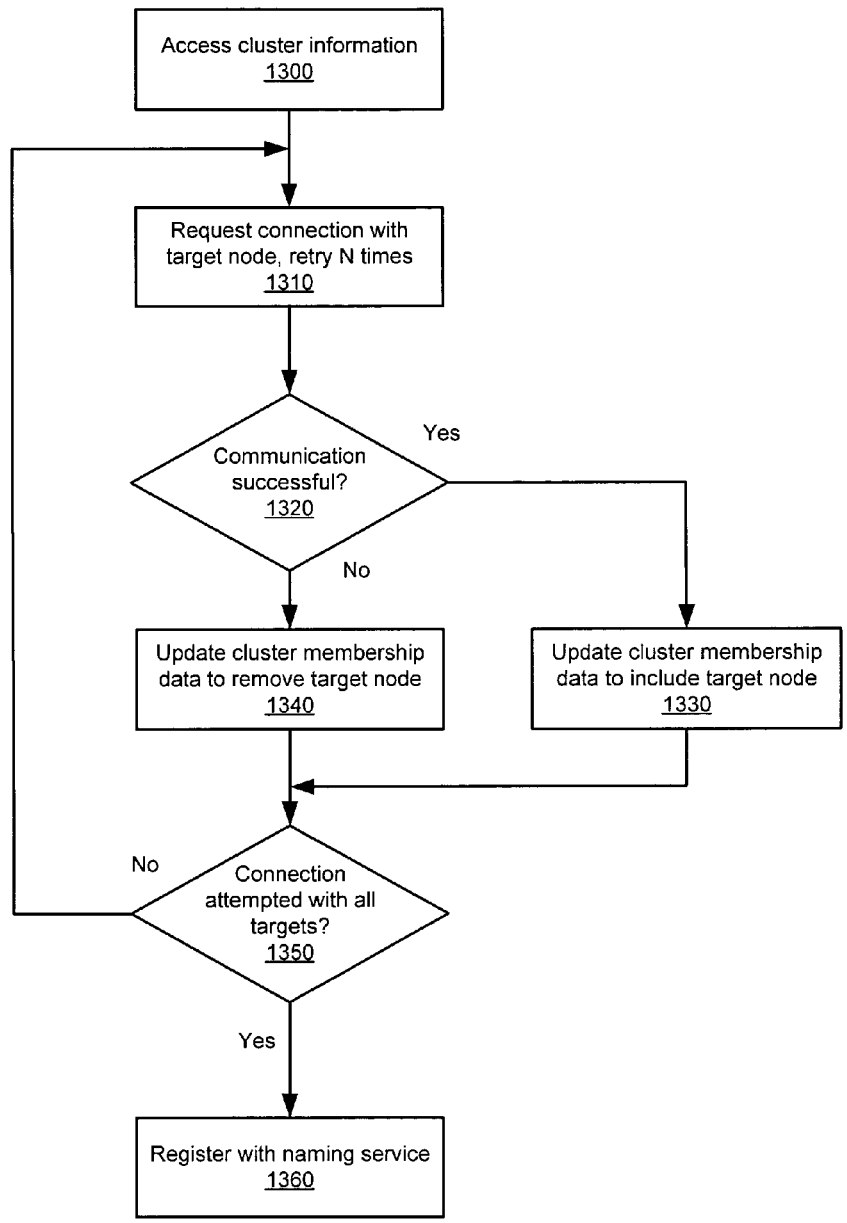
FIG. 13 is a flowchart of a method for establishing cluster membership data, according to one embodiment.

FIG. 13 is a flowchart of a method for establishing cluster membership data, according to one embodiment. At 1300 a node may undergo startup, and access current member names and naming ports from commonly accessible storage. In one embodiment, the commonly accessible storage may take the form of a database on a backend system coupled to the cluster nodes over the network used for cluster communication. At 1310 the node may begin to join the cluster by requesting a socket connection to a target node as identified from the cluster data in the commonly accessible storage. In one embodiment, a joining node may make N attempts to establish a connection with a target node before determining that the target node is unreachable.

When a member node receives a request for connection from a joining node, it may establish the connection. If the joining node determines, at decision block 1320, that the socket connection is successfully established, it may update its cluster membership information to include the name of the contacted node, as depicted in block 1330. Likewise, the member node may update its cluster membership information to include the name of the joining node. If, however the joining node determines, at decision block 1320, that the socket connection cannot be successfully established, it may update its cluster membership information to exclude the name of the targeted node, as depicted in block 1340. By repeating this process for each target node, the joining node may build a list of active cluster members, while adding itself to the cluster membership data of each active member. When the joining node has attempted to establish socket connections with all member nodes, as determined at decision block 1350, it may create a server socket and bind it to the naming service so that other nodes can perform lookups and connect to it, as shown in block 1360.

As described previously, cluster member nodes may use the socket connections established at startup for cluster management communications to support functions such as failover and load balancing by maintaining accurate cluster membership data. Depending upon the frequency with which such communications occur and the required coherency of cluster membership data from one node to another, each node may periodically communicate with every other node in the cluster in order to determine its status.

Figure 14:
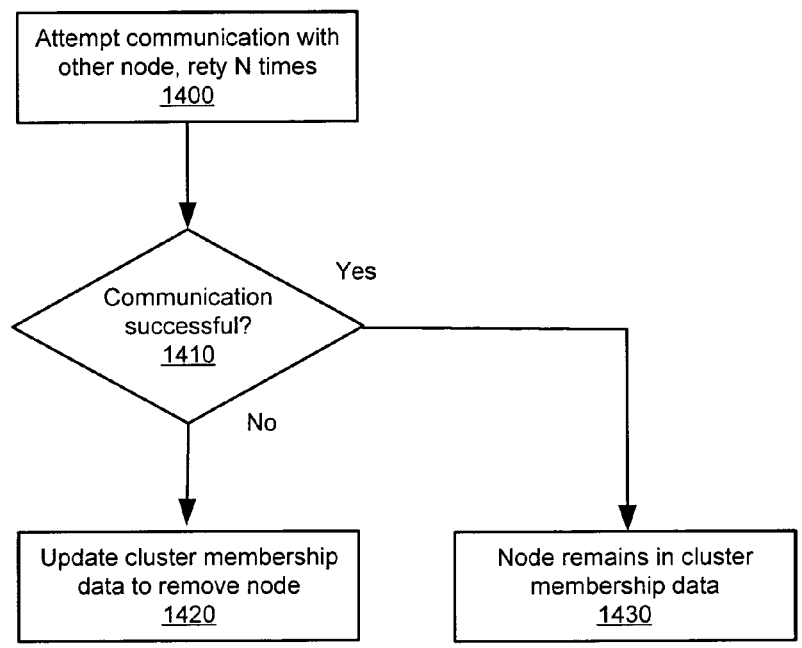
FIG. 14 is a flowchart for detecting a cluster node failure by socket communication over a peer-to-peer channel, according to one embodiment.

FIG. 14 is a flowchart for detecting a cluster node failure by socket communication over a peer-to-peer channel, according to one embodiment. At 1400, a cluster node may decide to attempt to communicate with another member and allow N tries before declaring the target node unreachable. If the communication is successful, as determined at decision block 1410, no further action may be taken and the target node may remain on the currently active membership list of the sending node, as shown in block 1430. However, if the communication is not successful, the initiating node may update its cluster membership list to remove the target node, as depicted in block 1420. Since each node on the cluster communication channel is a peer to every other node, each may attempt communication with the failed node and discover the failure for itself without the need to pass an updated cluster membership list among the nodes.

In addition to providing for independent detection of changes to cluster membership, the peer-to-peer cluster communication channel may facilitate other cluster management operations. For example, updating an existing application or adding a new application to a cluster may involve cloning or exact replication of resources to all nodes. In a cluster with a non peer-to-peer communication channel, changes to node configuration may have to be performed on a node-by-node basis. An administrator may access one node, change its configuration and then repeat this procedure for the other nodes in the cluster. This process may present significant opportunity for the administrator to fail to get the exact same configuration on each node. If the cluster is put into a state where resources have been added or updated on some nodes but not on others, system function and/or data integrity may be compromised.

Figure 15:
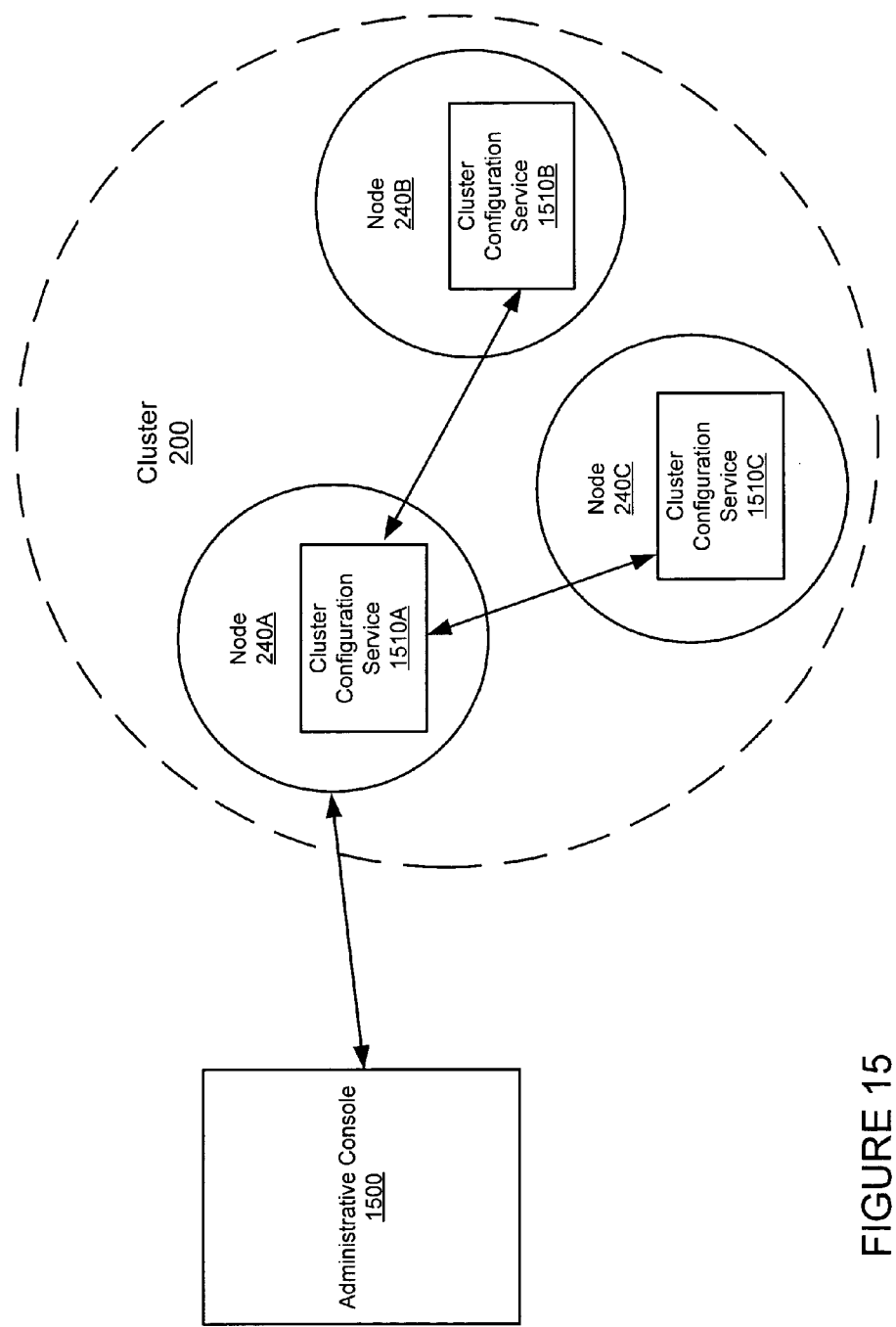
FIG. 15 illustrates a cluster in which each node includes a cluster configuration service 1510 for updating resources, according to one embodiment.

FIG. 15 illustrates a cluster in which each node includes a cluster configuration service 1510 for updating resources, according to one embodiment. In one embodiment, the cluster configuration service 1510 may be implemented within an admin server component of the server executing on the node. The nodes 240 of cluster 200 may be linked by a peer-to-peer communication channel, as described previously. Changes to the configuration of a particular node 240A may be managed by the cluster configuration service 1510A running on that node. The cluster configuration service 1510A may include a user interface to allow a system administrator to perform various node management functions through administrative console 1500. When the administrator makes changes to the node 240A configuration, the cluster configuration service 1510A may record all of the modifications that are made. Each time the administrator alters a node resource, the cluster configuration service 1510A may send a request for an identical change to be made by the cluster configuration service running in each of the other nodes of the cluster. In this way, changes initiated on one cluster node 240 may be propagated to the entire cluster 200.

The cluster configuration service 1510 in the node 240 on which the administrator is initiating changes may insure that those changes are propagated to the other nodes of the cluster 200 atomically. For example, if an administrator is using administrative console 1500 to add an application component to node 240A, cluster configuration service 1510A may communicate with cluster configuration services 1510B and C for each step of the addition. At some point during the operation, cluster configuration service 1510A may get a failure indication from a communication with cluster configuration service 1510C. In response, cluster configuration service 1510A may "rollback" all changes made to nodes 240B and C as well as those made to node 240A and display and error message for the administrator.

Figure 16A:
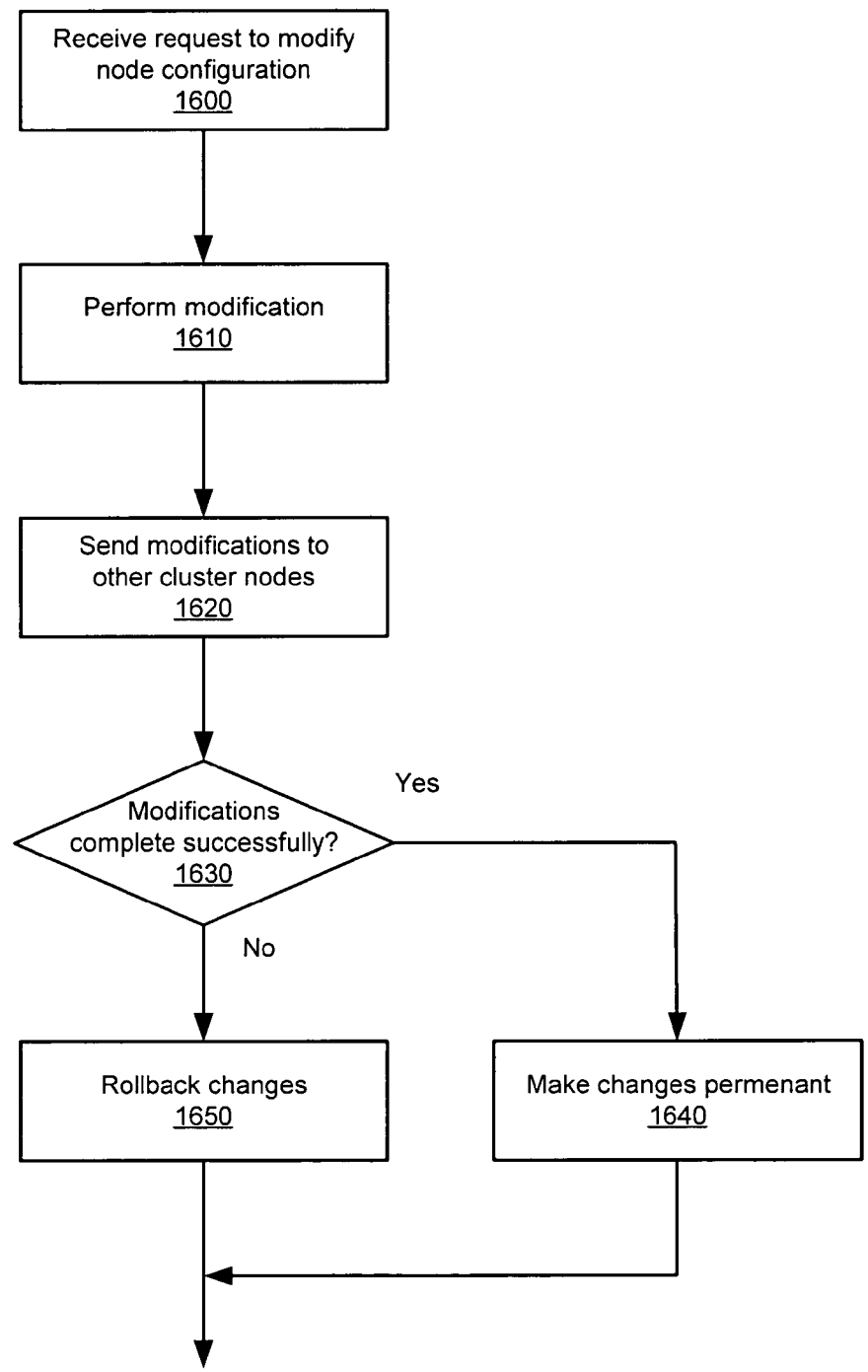
FIG. 16A is a flow chart of a method for making changes to the configuration of an initiator node, according to one embodiment.

FIG. 16A is a flow chart of a method for making changes to the configuration of an initiator node, according to one embodiment. At block 1600, a cluster configuration service in an initiator node may receive a request to modify the configuration of the node. As shown in block 1610, the cluster configuration service may make the requested change to the initiator node configuration in such a way that the previous configuration can be restored if necessary. For example the cluster configuration service may store data necessary to restore the previous configuration in a temporary file. At block 1620, the cluster configuration service may send requests to corresponding cluster configuration services in each of the other cluster nodes (responding nodes) to have them make the same change to their node's configuration in the same tentative fashion.

In response to the returns received from the requests to the responding cluster nodes, the cluster configuration service in the initiator node may determine whether the configuration change requests were successfully executed, as indicated by decision block 1630. If all responses indicate success, the cluster configuration service may request that all cluster nodes make the change permanent, as shown in block 1640. However, if it is determined at decision block 1630 that one or more of the nodes cannot commit to making the change, the cluster configuration service may request that all cluster nodes rollback their configurations to the state prior to the change request, as illustrated in block 1650.

Figure 16B:
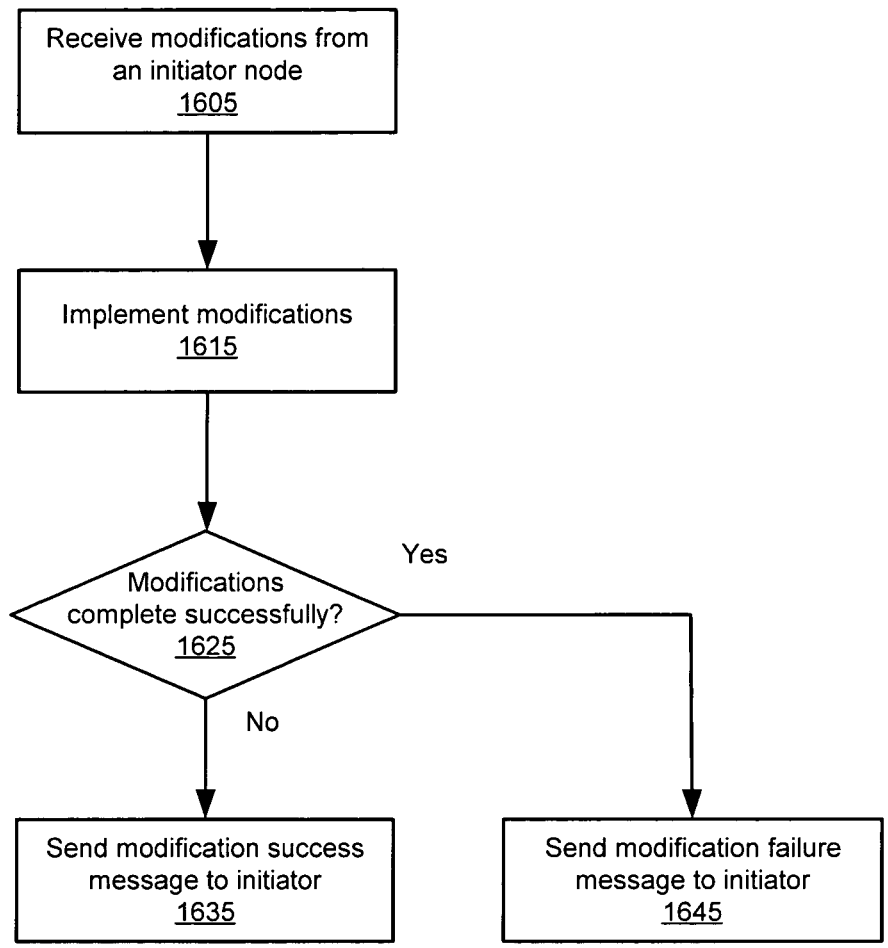
FIG. 16B is a flow chart of a method for making changes to the configuration of a responder node, according to one embodiment.

FIG. 16B is a flow chart of a method for making changes to the configuration of a responder node, according to one embodiment. At 1605, a responder node may receive modifications from the initiator node. The cluster configuration service of the responder node may attempt to make the requested change to the node configuration in such a way that the previous configuration can be restored if necessary, as indicate by block 1615. If the modifications are successfully implemented, as determined in decision block 1625, the responder may send a success message to the initiator, as indicated by block 1635. On the other hand, if the modifications are not successfully implemented on the responder's configuration, as determined in decision block 1625, the responder may send a failure message to the initiator, as indicated by block 1645.

Figure 17:
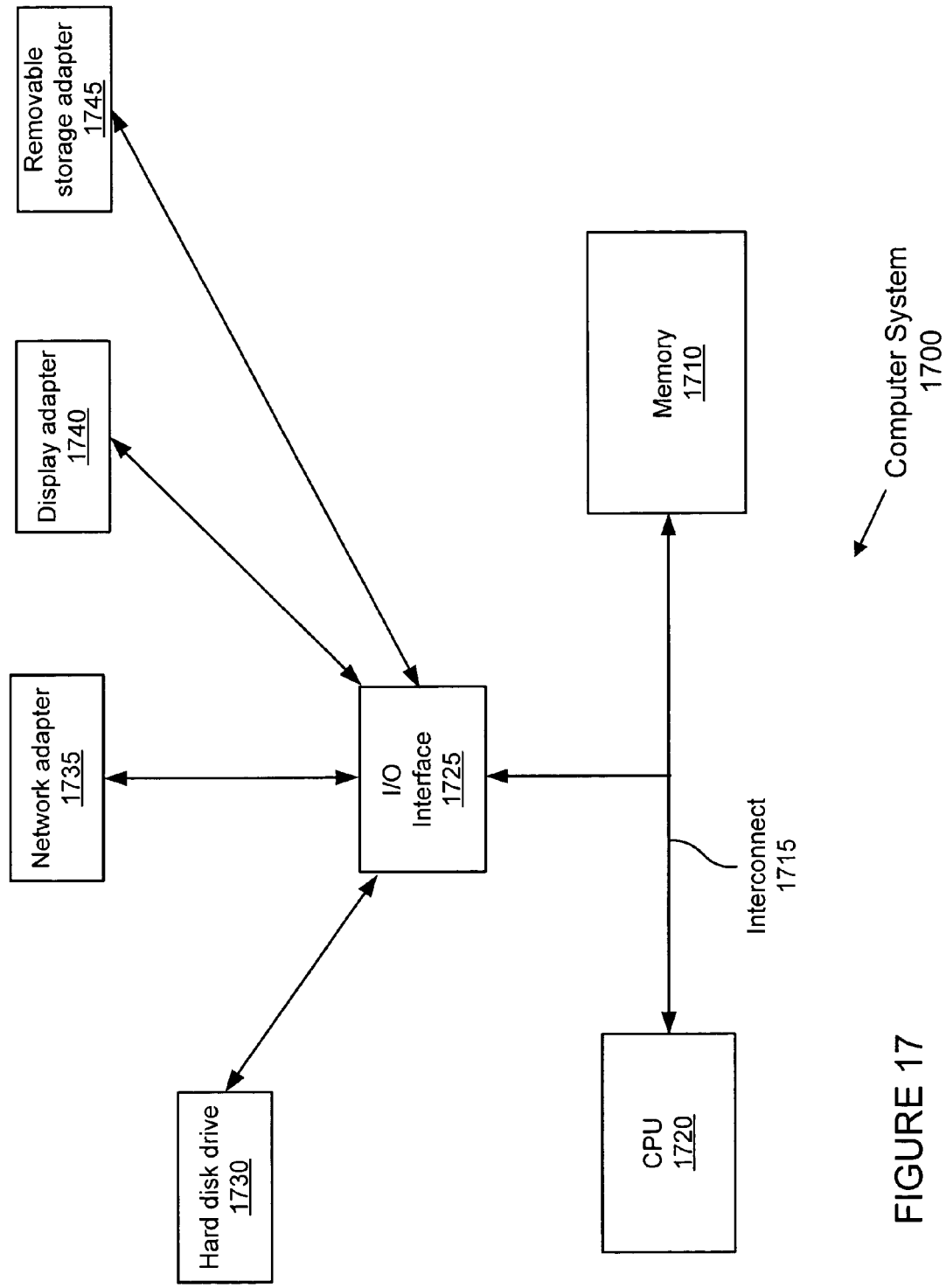
FIG. 17 illustrates an exemplary computer system according to one embodiment.

FIG. 17 illustrates one embodiment of a computer system 1700 that may include one or more of the features, described herein. Computer system 1700 may include many different components such as memory 1710, a central processing unit (CPU) or processor 1720, and an input/output (I/O) interface 1725. Interconnect 1715 is relied upon to communicate data from one component to another. For example, interconnect 1715 may be a point-to-point interconnect, a shared bus, a combination of point-to-point interconnects and one or more buses, and/or a bus hierarchy including a system bus, CPU bus, memory bus and I/O buses such as a peripheral component interconnect (PCI) bus.

The computer system 1700 preferably includes a memory medium on which computer programs according to various embodiments may be stored. The term "memory medium" may include an installation medium, e.g., a CD-ROM, or floppy disk; a computer system memory such as DRAM, SRAM, EDO DRAM, SDRAM, DDR SDRAM, Rambus RAM, etc., or a non-volatile memory such as a magnetic media, e.g., a hard drive 1730, or optical storage. The memory medium may include other types of memory as well, or combinations thereof. In addition, the memory medium may be located in a first computer in which the programs are executed, or may be located in a second different computer, which connects to the first computer over a network. In the latter instance, the second computer provides the program instructions to the first computer for execution.

Also, the computer system 1700 may take various forms, including a personal computer system, mainframe computer system, workstation, network appliance, Internet appliance, personal digital assistant (PDA), television system or other device. In general, the term "computer system" can be broadly defined to encompass any device having a processor, which executes instructions from a memory medium. The memory medium preferably stores a software program or programs for event-triggered transaction processing as described herein. The software program(s) may be implemented in any of various ways, including procedure-based techniques, component-based techniques, and/or object-oriented techniques, among others. For example, the software program may be implemented using ActiveX controls, C++ objects, JavaBeans, Microsoft Foundation Classes (MFC), or other technologies or methodologies, as desired.

Memory 1710 may store program instructions accessed by the CPU 1720. For example, instructions and data implementing a load-balancing framework 920 and/or a cluster configuration service 1510 may be stored in memory 1710. Load-balancing framework 920 may facilitate the pluggability of a custom load balancer and the execution of load-balancing functions in a system including a server cluster. Cluster configuration service 1510 may insure that changes to the configuration of cluster nodes are made atomically.

Computer system 1700 may further include other software and hardware components, such as an input/output (I/O) interface 1725, that may be coupled to various other components and memory 1710. The CPU 1720 may acquire instructions and/or data through the I/O interface 1725. Through the I/O interface 1725, the CPU 1720 may also be coupled to one or more I/O components. As illustrated, I/O components may include a hard disk drive 1730, a network adapter 1735, a display adapter 1740 and/or a removable storage adapter 1745. Some components 1730 to 1745 may be coupled to the I/O interface 1725. In addition, the computer system 1700 may include one or more of a particular type of component. The computer system 1700 may include one or more components coupled to the system through a component other than the I/O interface 1725. Some computer systems may include additional and/or other components such as application software (e.g., stored in memory 1710), other CPUs, video monitors or other displays, track balls, mice, keyboards, printers, plotters, scanners, or other types of I/O devices for use with computer system 1700.

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The flow charts described herein represent exemplary embodiments of methods. The methods may be implemented in software, hardware, or a combination thereof. The order of method may be changed, and various elements may be added, reordered, combined, omitted, modified, etc.

Various modifications and changes may be made to the invention as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

Various embodiments may further include receiving, sending or storing instructions and/or data implemented in accordance with the foregoing description upon a computer readable medium. Generally speaking, a computer readable medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

What is claimed is:

1. A system, comprising:
   a cluster comprising a plurality of nodes, wherein each node comprises a server configured to execute a distributed application component, and wherein each node is coupled to a network; and
   a commonly accessible storage coupled to the network and configured to store cluster membership information, wherein the commonly accessible storage is accessible by each of the plurality of nodes of the cluster;
   a joining node configured to join the cluster, wherein to join the cluster, the joining node is configured on startup to:
      access the commonly accessible storage to retrieve the cluster membership information; and
      request a peer-to-peer connection to every one of the plurality of current nodes of the cluster based on the cluster membership information, wherein, in response to a connection failure, the joining node is further configured to retry its attempt to establish a connection with a cluster node a specified number of times.

2. The system, as recited in claim 1, wherein the joining node is configured to establish a connection with each node of the cluster according to the cluster membership information, wherein in response to a successful connection the joining node and current node each update respective cluster membership lists.

3. A system, comprising:
   a cluster comprising:
      a plurality of nodes, wherein each node comprises a server configured to execute a distributed application component;
      wherein each node is coupled to a network;
      wherein each node maintains a peer-to-peer connection with every other node of the cluster for cluster configuration and membership communications, wherein each node is configured to update both its cluster membership list and its application configuration using the same peer-to-peer connection with each other node of the cluster, respectively; and
      wherein each node further comprises a cluster configuration service configured to, in response to a request to modify the cluster configuration:
         perform the requested modification on the configuration of its node;
         send a modification request to every other node using the peer-to-peer connections; and
         if the modification is not performed successfully on all nodes, rollback the modification on all nodes.

4. The system as recited in claim 3, wherein each node is further configured to attempt to communicate with another one of the plurality of nodes periodically or aperiodically to determine that the another one of the plurality of nodes is still an active member of the cluster.

5. The system, as recited in claim 4, wherein each node is further configured to update its cluster membership list to remove the another one of the plurality of nodes in response to a failure to communicate with it.

6. The system, as recited in claim 3, wherein the cluster configuration service is further configured to, in response to a request to modify the configuration of its node:
   perform the requested modification on the configuration of its node; and
   send a response to a requesting node indicating success or failure for the modification using the peer-to-peer connections.

7. A method performed by a node, comprising:
   accessing cluster membership information from a commonly accessible storage accessible by each of a plurality of nodes of a cluster;
   requesting a respective peer-to-peer connection with every one of the cluster nodes based on the cluster membership information, wherein said requesting comprises retrying to establish the connection with a particular node a specified number of times in response to an initial request for the connection with a particular node failing; and
   adding each one of the cluster nodes to a cluster membership list in response to establishing a connection with each one of the cluster nodes.

8. The method as recited in claim 7, further comprising establishing connection with a joining node and adding the joining node to the cluster membership list.

9. A method performed by a node of a cluster, comprising:
   maintaining a respective peer-to-peer connection with each one of a plurality of other nodes in the cluster;
   attempting to communicate with each one of the plurality of other nodes in the cluster using a corresponding peer-to-peer connection for each other node, wherein attempting to communicate with one of the nodes comprises retrying the communication a specified number of times; and
   removing one of the plurality of other nodes from a cluster membership list if the attempt to communicate with it is unsuccessful.

10. A method, comprising:
    a node receiving a request to modify the configuration of a cluster and in response:
       modifying its configuration;

sending a modification request to all other nodes of a cluster; and in response to detecting that the modification was not successful on one or more of the cluster nodes, rolling back the modification on all cluster nodes including itself.

11. The method as recited in claim 10, further comprising:

a node receiving a request to modify its configuration and in response:

modifying the receiving node's configuration; and sending a response to the requesting node indicating success or failure for the modification.

12. A computer-accessible medium comprising program instructions, wherein the program instructions are computer-executable on a node to:

access cluster membership information from a commonly accessible storage accessible by each of a plurality of nodes of a cluster;

request respective a peer-to-peer connection with every one of the cluster nodes based on the cluster membership information, wherein to establish each connection, the program instructions are further computer-executable to retry the attempt a specified number of times; and update a cluster membership list in response to establishing each connection.

13. The computer-accessible medium, as recited in claim 12, wherein the program instructions are further computer-executable to attempt to establish a connection with each of a plurality of nodes indicated by the cluster membership information and update a cluster membership list to indicate an active cluster member if the connection is successful.

14. A computer-accessible medium comprising program instructions, wherein the program instructions are computer-executable on a node of a cluster to:

maintain a respective peer-to-peer connection with every one of a plurality of other nodes in the cluster;

attempt communications from the node to each one of the plurality of other nodes using the corresponding connection for each other node;

update a cluster membership list of the node to remove one of the plurality of other nodes in response to a failure of the communications; and in response to a request to modify the cluster configuration:

perform the requested modification on the configuration of the node;

send a modification request to every other node using the peer-to-peer connections; and in response to the modification not being performed successfully on all nodes, rollback the modification on all nodes.

15. The computer-accessible medium, as recited in claim 14, wherein to attempt communications from the node to each one of the plurality of other nodes, the program instructions are further computer-executable to retry each attempt a specified number of times.

16. The computer-accessible medium, as recited in claim 14, wherein the program instructions are further computer-executable to attempt communications from the node to each one of the plurality of other nodes periodically or aperiodically.

17. The computer-accessible medium, as recited in claim 14, wherein the program instructions are further computer-executable to, in response to the request to modify the configuration of the node:

receive a response from another node indicating success or failure for the modification using the corresponding peer-to-peer connection.

* * * * *